(12) United States Patent
Bell et al.

(10) Patent No.: US 6,609,672 B2
(45) Date of Patent: Aug. 26, 2003

(54) SEAT BELT RETRACTOR SPOOL

(75) Inventors: John Bell, Carlisle (GB); Andrew Park, Wigton (GB); Martyn Palliser, Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/127,587

(22) Filed: Apr. 23, 2002

(65) Prior Publication Data

US 2002/0190151 A1 Dec. 19, 2002

(30) Foreign Application Priority Data

Jun. 19, 2001 (GB) .............................................. 0114926

(51) Int. Cl.7 ......................... B60R 22/28; B60R 22/36; B65H 75/28
(52) U.S. Cl. ................... 242/376; 242/587.1; 242/379.1
(58) Field of Search .............................. 242/376, 379.1, 242/587.1; 280/805, 806; 297/475–478

(56) References Cited

U.S. PATENT DOCUMENTS

| 4,967,976 A | * | 11/1990 | Kawai et al. ................ 242/376 |
| 5,722,611 A | | 3/1998 | Schmid et al. ............... 242/376 |
| 6,059,223 A | | 5/2000 | Kempfle et al. .......... 242/587.1 |
| 6,202,957 B1 | * | 3/2001 | Bannert et al. ............. 242/376 |

FOREIGN PATENT DOCUMENTS

GB  2354208  3/2001

* cited by examiner

*Primary Examiner*—John M. Jillions
(74) *Attorney, Agent, or Firm*—Lonnie Drayer

(57) ABSTRACT

A spool for a vehicle safety restraint has a cylindrical central spool member made of two separate pieces. The cylindrical portion has a hollow section along its axis for accommodating seat belt webbing and a torsion bar, with a seat belt webbing entrance slot and a seat belt webbing exit slot. A filler plate is shaped to fit snugly into the entrance slot and to hold the parts of the spool assembly including the torsion bar and the spool against movement thereby holding the spool together.

17 Claims, 2 Drawing Sheets

SEAT BELT RETRACTOR SPOOL

FIELD OF THE INVENTION

The present invention relates to a spool for a retractor for a seat belt arrangement and particularly to a spool for a load limiting seat belt retractor having a torsion bar.

BACKGROUND OF THE INVENTION

A seat belt safety restraint has seat belt webbing wound on a spool, which is mounted for rotation about the spool's longitudinal axis to wind in or pay out belt webbing. The spool is biased in a winding-up direction by a spiral spring. When a sensor detects a crash, for example by detecting acceleration or deceleration above a predetermined threshold, a locking mechanism is activated to lock the spool against rotation and prevent further pay-out of belt webbing, thus restraining a vehicle occupant against forward motion.

The use of a torsion bar is well known for load limiting seat belt retractor and is arranged in the force path to absorb some of the crash forces to reduce the effects of the seat belt restraint on the vehicle occupant in a crash. A torsion bar is malleable and deforms plastically as it twists without shearing and allows a small amount of pay-out of seat belt webbing after the spool has been locked against rotation. A torsion bar is usually arranged coaxial with the spool having one end connected to the spool and the opposite end arranged to be locked against rotation in the event of a crash, e.g. by a locking pawl engaging a toothed ratchet wheel attached to the torsion bar.

Typically, to accommodate a torsion bar, a seat belt retractor spool is made hollow and may be assembled from two parts placed around the torsion bar and riveted or staked together. This requires dedicated equipment on the retractor production line and the process of fixing the two spool parts together is time consuming. The resultant seat belt retractor spool is not as strong as would be desired since there is no substantial support for the torsion bar around its main diameter. When a load is applied in a crash, the webbing pin used to retain seat belt webbing during the crash can bend and is forced into a gap between the torsion bar gap between the torsion bar and the spool member. Since both ends of the torsion bar are supported, the torsion bar bends at its middle, the weakest point. This bending changes the direction of the load on the webbing pin/spool member and the spool is weakened and may fail prematurely. This is especially so since a webbing pin, traditionally sewn onto the end of the belt webbing to hold the end in the spool, often is able to push against the torsion bar under load conditions.

SUMMARY OF THE INVENTION

According to the present invention, there is provided a seat belt retractor spool assembly comprising a cylindrical central spool member having a longitudinal axis and a hollow section along said axis and having a belt webbing entrance slot and a belt webbing exit slot, a torsion bar is located in the hollow section of the spool member, a gear wheel for rotatably driving the spool and a filler plate is shaped to fit into the entrance slot and prevents relative movement of the torsion bar, the gear wheel and the cylindrical central spool member.

A seat belt retractor spool according to the invention can be made more cheaply and more quickly since there are fewer parts to assemble and less manufacturing steps, particularly compared to the riveted spools of the prior art, and the spool assembly is stronger under load.

DETAILED DESCRIPTION OF THE INVENTION

Figure 1:
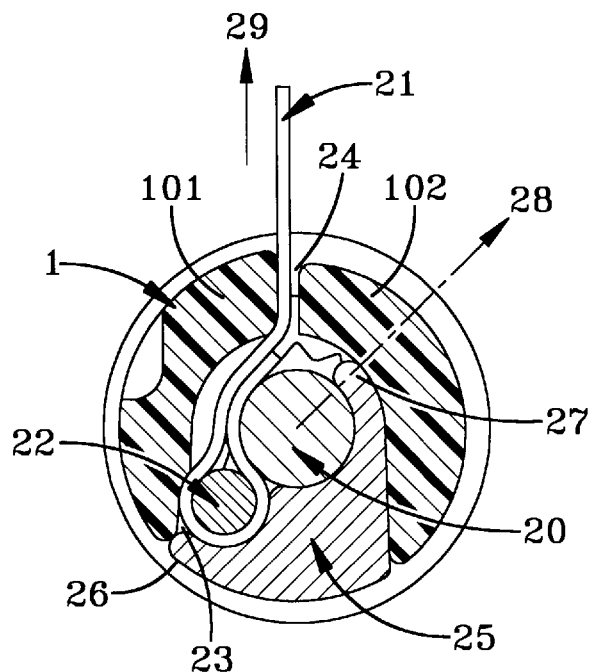
FIG. 1 is an axial cross-section of a seat belt retractor spool according to the present invention.

In the figures like reference characters denote like parts.

FIG. 1 is an axial cross-section of a seat belt retractor spool 1 according to the present invention. A seat belt retractor spool 1 has a hollow cylindrical shape and comprises two parts 101, 102 each formed of a molded plastic material. The seat belt retractor spool has a main central cylindrical section and two integral end plates as can most clearly be seen in FIG. 3. The hollow center of the spool 1 extends the length of the spool 1 along the longitudinal axis 4 and through the end plates.

The two parts 101, 102 of the spool 1 extend around a torsion bar 20 and belt webbing 21 is held in a hollow, in a gap between the spool parts 101, 102 and the torsion bar 20. An end portion of the belt webbing 21 is sewn around a webbing pin 22 which is jammed into the gap and prevents the seat belt webbing 21 from being detached from the seat belt retractor spool under load. The webbing pin 22 fits into a relatively large recess 23 formed at one junction of the two parts 101,102 of the spool 1 (this is the lower junction as illustrated in FIG. 1). Into this recess 23 is placed a filler plate 25. Preferably, the filler plate is a molded part formed of a plastic material. Alternatively the filler plate can be made of die-cast metal. The filler plate is profiled to fill the gap and preferably fit snugly into the recess 23, around at least a portion of the webbing pin 22 and around at least a portion of the torsion bar 20. To this end the filler plate 25 has, in cross section, two opposing arcuate arms, one arm 26 abutting the webbing pin 22 and the other arm 27 abutting the torsion bar 20. The arms 26, 27 abut the webbing pin 22 and the torsion bar 20 respectively along their axial lengths and preferably around a substantial portion of their respective circumferences. As illustrated, the portion of the axial length of the torsion bar thus supported is about 50% but less or more is contemplated for example, anything from 20% to 80% would be possible provided sufficient support is given to resist bending of the torsion bar 20 under load.

Advantageously, the filler plate comprises means to hold the torsion bar substantially along its whole length in a line generally diametrically opposite the position of the webbing pin 22. The arms 26, 27 of the filler plate may clip resiliently onto the webbing pin 22 or torsion bar 20 respectively. This provides support for the webbing pin 22 and for the torsion bar 20 along a substantial portion of their respective lengths and resists the forces which, under load, tend to bend the torsion bar 20 and to pull the two parts 101, 102 of the spool 1 away from each other. The arrow 28 indicates the direction of the pull on the torsion bar 20 when the seat belt retractor spool 1 is under load with the seat belt webbing being pulled in the direction of the arrow 29. Thus the filler plate fills the gap around the torsion bar opposite the webbing pin so that load applied to the torsion bar is less likely to cause the torsion bar to bend and improving the strength of the retractor.

The other junction 24 of the two parts 101, 102 of the spool 1 (at the top of FIG. 1) forms a slot through which the belt webbing 21 exits the spool 1.

The filler plate 25 also provides a smooth outer surface so that seat belt webbing can pass smoothly over the outside of the spool 1 and does not snag or interfere with the webbing pin 22 in the recess 23. This assists in the smooth and satisfactory operation of a seat belt retractor fitted with such a spool 1.

Figure 2:
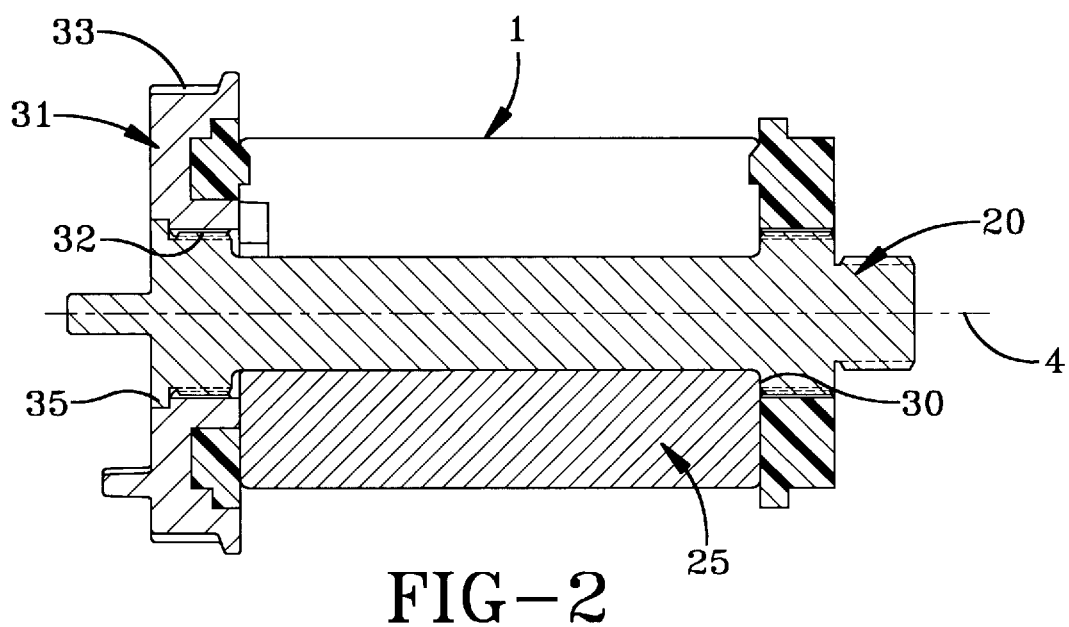
FIG. 2 is a longitudinal cross-section view of the seat belt retractor spool of FIG. 1.

In FIG. 2 the seat belt retractor spool 1 is shown in longitudinal cross-section and it can be seen that the filler plate 25 extends the length of the main central cylindrical section of the spool 1. At the right hand end, as shown in the figure, the filler plate 25 fits behind a shoulder 30 of the torsion bar 20 preventing the torsion bar 20 from moving axially to the left. At the left hand end, as illustrated, the torsion bar 20 has a flange 35 abutting the gear ring 31, preventing axial movement of the torsion bar 20 to the right.

Figure 3:
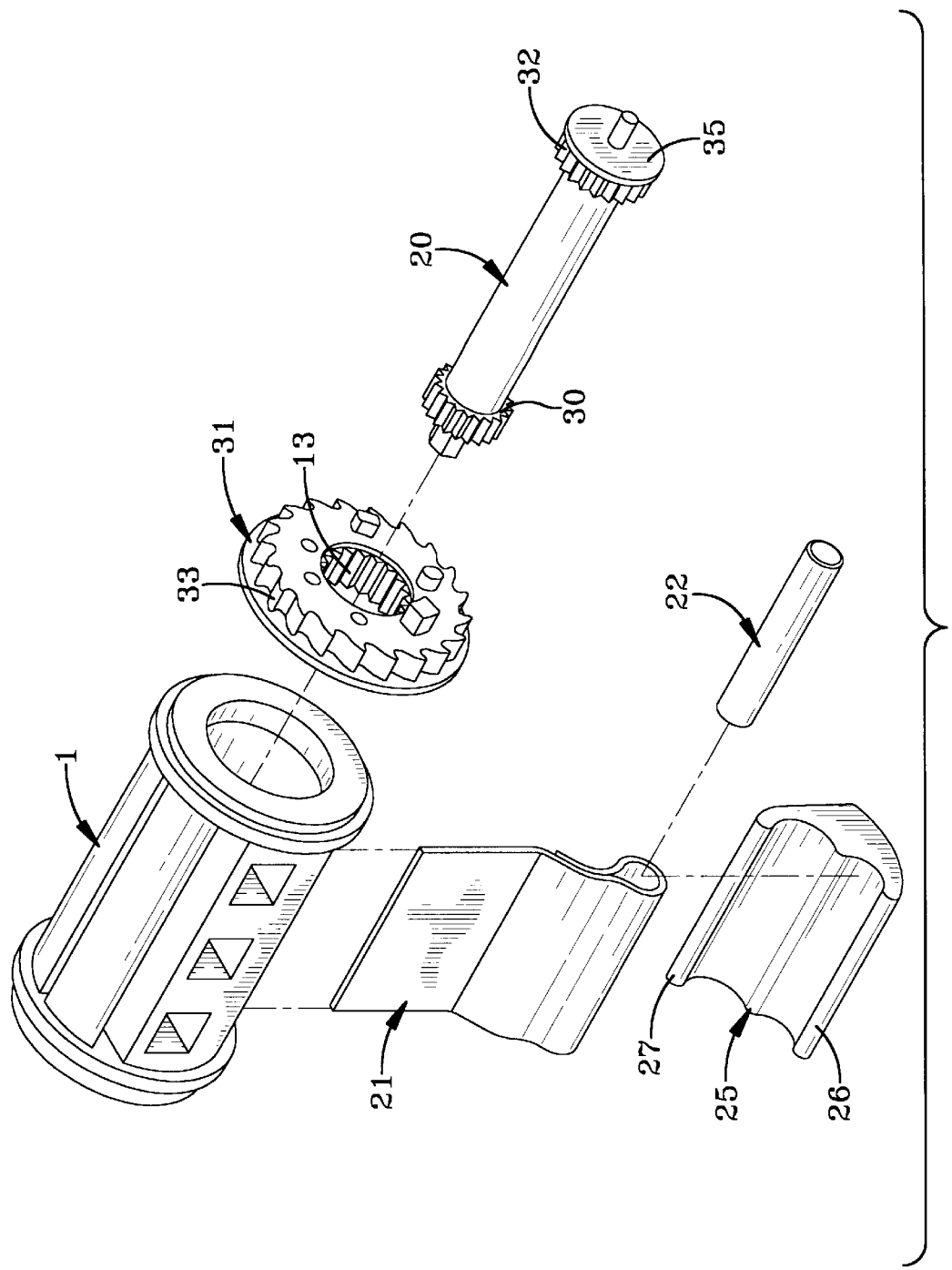
FIG. 3 is an exploded perspective view of the seat belt retractor spool of FIGS. 1 and 2.

In FIG. 3 the parts of the seat belt retractor are shown in exploded view and the juxtaposition of the spool 1 with a gear ring 31, mated with the torsion bar 20 is clearly shown. The gear ring 31 has internal gear teeth 13 to engage the gear teeth 32 at one end of the torsion bar and has external gear teeth 33 which are engaged by a pawl (not shown) in a known manner when it is required to lock the spool 1 against further pay-out of seat belt webbing 21 in an emergency situation.

The arcuate arms 26, 27 of the filler plate 25 can be clearly seen in FIG. 3.

Many changes and modifications in the above described embodiment of the invention can, of course, be carried out without departing from the scope thereof. Accordingly, that scope is intended to be limited only by the scope of the appended claims.

We claim:

1. A seat belt retractor spool assembly comprising a cylindrical central spool member having a hollow section along its axis, and having a seat belt webbing entrance slot and a seat belt webbing exit slot, a torsion bar located in the hollow section of the spool member, a gear ring for locking the spool and a filler plate shaped to fit into the entrance slot and to abut the torsion bar, the gear ring and the cylindrical central spool member to hold them against movement relative to each other.

2. The seat belt retractor spool assembly according to claim 1 wherein the torsion bar has a shoulder and the filler plate is shaped to fit behind the shoulder of the torsion bar and hold the torsion bar against axial movement.

3. The seat belt retractor spool assembly according to claim 1 wherein the cylindrical central spool member comprises two separately formed pieces.

4. The seat belt retractor spool assembly according to claim 2 wherein the cylindrical central spool member comprises two separately formed pieces.

5. The seat belt retractor spool assembly according to claim 2 wherein the filler plate has a first arm which abuts the torsion bar about a substantial portion of the circumference of the torsion bar.

6. The seat belt retractor spool assembly according to claim 3 wherein the filler plate has a first arm which abuts the torsion bar about a substantial portion of the circumference of the torsion bar.

7. The seat belt retractor spool assembly according to claim 4 wherein the filler plate has a first arm which abuts the torsion bar about a substantial portion of the circumference of the torsion bar.

8. The seat belt retractor spool assembly according to claim 5 wherein the filler plate first arm abuts approximately 50% of the circumference of the torsion bar.

9. The seat belt retractor spool assembly according to claim 4 wherein the filler plate first arm extends along a major portion of the length of the torsion bar.

10. The seat belt retractor spool assembly according to claim 5 wherein the filler plate first arm is resilient so as to grip to torsion bar.

11. The seat belt retractor spool assembly according to claim 5 wherein the filler plate first arm is arcuate in cross section.

12. The seat belt retractor spool assembly according to claim 1 wherein the filler plate is a molded part formed of a plastic material.

13. The seat belt retractor spool assembly according to claim 1 wherein the filler plate is made by die-casting metal.

14. The seat belt retractor spool assembly according to claim 5 wherein the filler plate further comprises a second arm for holding a pin securing the seat belt webbing in the spool.

15. The seat belt retractor spool assembly according to claim 14 wherein said second arm extends substantially the length of the spool.

16. The seat belt retractor spool assembly according to claim 14 wherein said second arm is arcuate and is generally positioned diametrically opposite the first arm.

17. The seat belt retractor spool assembly according to claim 15 wherein said second arm is arcuate and is generally positioned diametrically opposite the first arm.

* * * * *